US012539628B2

(12) United States Patent

Delplanche et al.

(10) Patent No.: US 12,539,628 B2
(45) Date of Patent: Feb. 3, 2026

(54) ADJUSTABLE WEIGHTING SYSTEM IN KNIFE HANDLES

(71) Applicant: BENCHMADE KNIFE CO., INC., Oregon City, OR (US)

(72) Inventors: Mark Delplanche, Beavercreek, OR (US); Vance Collver, Gladstone, OR (US); Ryan Dickman, Sandy, OR (US)

(73) Assignee: BENCHMADE KNIFE CO., INC., Oregon City, OR (US)

( * ) Notice: Subject to any disclaimer, the term of this patent is extended or adjusted under 35 U.S.C. 154(b) by 563 days.

(21) Appl. No.: 17/858,981

(22) Filed: Jul. 6, 2022

(65) Prior Publication Data

US 2024/0009870 A1 Jan. 11, 2024

(51) Int. Cl.
*B26B 1/10* (2006.01)
*B26B 3/00* (2006.01)

(52) U.S. Cl.
CPC .................. *B26B 1/10* (2013.01); *B26B 3/00* (2013.01)

(58) Field of Classification Search
CPC .... B26B 1/00; B26B 1/02; B26B 1/04; B26B 1/10; B26B 3/00; B21K 11/02; B25G 1/00
USPC .................................................... 30/153, 155
See application file for complete search history.

(56) References Cited

U.S. PATENT DOCUMENTS 187,483 A * 2/1877 Rightor ................... B26B 11/00 30/152
229,706 A * 7/1880 Jansen ...................... B26B 1/02 30/153
237,498 A * 2/1881 Deasey ................... B26B 21/06 30/153
365,086 A * 6/1887 Miller ....................... B26B 1/04 30/153
1,498,886 A * 6/1924 Platts ........................ B26B 1/10 30/164
1,549,545 A * 8/1925 Hickman .................. B26B 1/04 30/153

(Continued)

FOREIGN PATENT DOCUMENTS

CN 106573386 A 4/2017
CN 108015812 A * 5/2018 ............... B26B 1/10

(Continued)

OTHER PUBLICATIONS

Int'l Patent Application No. PCT/US2023/026961; Int'l Search Report/Written Opinion; Oct. 18, 2023.

*Primary Examiner* — Jason Daniel Prone
(74) *Attorney, Agent, or Firm* — Schwabe, Williamson & Wyatt, P.C.

(57) ABSTRACT

A knife includes a blade and a handle attached to the blade. The handle includes a liner and a handle scale adapted to be removably secured to the liner, such as by screws. The handle scale has an inner side facing the liner and having a shaped region to secure a weight in a selected position along a length of the handle scale. In one approach, there are multiple discrete positions in which one or more weights can be secured. The weights can be metal discs, for example. In the case of a two-handed knife such as a butterfly knife, both handles can have a similar structure for storing weights. The knife allows the end user to easily customize the weight distribution of a knife without interfering with the envelope or exterior surfaces of the handles.

12 Claims, 10 Drawing Sheets

(56) References Cited

U.S. PATENT DOCUMENTS

| | | | | |
|---|---|---|---|---|
| 1,659,418 | A * | 2/1928 | Werner | B26B 1/04 30/153 |
| 1,665,955 | A * | 4/1928 | Gatewood | B26B 1/04 30/153 |
| 1,862,649 | A * | 6/1932 | Amoroso | B26B 1/10 30/155 |
| 2,170,537 | A * | 8/1939 | Mirando et al. | B26B 1/10 30/164 |
| 2,270,074 | A * | 1/1942 | Miller | B26B 1/10 30/164 |
| 2,658,272 | A * | 11/1953 | Lillard | B26B 1/10 30/138 |
| 2,736,959 | A * | 3/1956 | Simon et al. | B26B 1/10 30/155 |
| 3,317,996 | A * | 5/1967 | Paolantonio | B26B 1/10 30/164 |
| 4,067,947 | A * | 1/1978 | Miori | B26B 1/10 264/274 |
| 4,147,443 | A * | 4/1979 | Skobel | B25G 1/10 30/343 |
| 4,218,819 | A * | 8/1980 | Phelps | B26B 1/02 30/157 |
| 4,330,937 | A * | 5/1982 | Cope | A22C 25/006 30/153 |
| 4,364,174 | A * | 12/1982 | De Asis | B26B 1/10 30/153 |
| 4,470,327 | A | 9/1984 | Gerber, Jr. et al. | |
| 4,547,965 | A * | 10/1985 | Moore | B26B 1/04 30/153 |
| 4,555,822 | A * | 12/1985 | Miceli | B26B 1/04 30/153 |
| 4,573,268 | A * | 3/1986 | Call | B26B 1/048 30/160 |
| 4,648,145 | A * | 3/1987 | Miceli | B26B 11/003 30/153 |
| 4,669,140 | A * | 6/1987 | Miceli | B26B 1/00 30/153 |
| 4,672,743 | A * | 6/1987 | Grahm | B26B 1/00 30/153 |
| 4,722,140 | A * | 2/1988 | Miceli | B26B 1/02 30/153 |
| 5,044,079 | A * | 9/1991 | Gibbs | B26B 1/042 30/158 |
| 5,244,210 | A * | 9/1993 | Au | A63B 53/0487 473/336 |
| 5,333,871 | A * | 8/1994 | Wishon | A63B 53/04 473/350 |
| 5,400,509 | A * | 3/1995 | Collins | B26B 1/042 30/155 |
| 5,605,495 | A * | 2/1997 | Jenkins, Jr. | B26B 11/00 30/138 |
| 5,694,692 | A * | 12/1997 | Reinschreiber | B26B 1/042 30/155 |
| 5,769,094 | A * | 6/1998 | Jenkins, Jr. | B26B 1/048 30/160 |
| 6,015,354 | A * | 1/2000 | Ahn | A63B 53/04 473/341 |
| 6,195,898 | B1 * | 3/2001 | Lemisch | B26B 1/04 30/153 |
| 6,277,032 | B1 * | 8/2001 | Smith | A63B 53/047 473/336 |
| 6,328,666 | B1 * | 12/2001 | Manory | A63B 69/0026 473/437 |
| 6,348,014 | B1 * | 2/2002 | Chiu | A63B 53/065 473/340 |
| 6,550,142 | B1 * | 4/2003 | Moser | B26B 3/06 30/153 |
| 6,625,890 | B2 * | 9/2003 | Hufnagel | B25G 3/36 30/344 |
| 7,100,285 | B1 * | 9/2006 | Huang | B26B 5/001 30/162 |
| 7,201,669 | B2 * | 4/2007 | Stites | A63B 60/02 473/337 |
| 7,309,297 | B1 * | 12/2007 | Solari | A63B 60/00 473/409 |
| 7,676,930 | B1 * | 3/2010 | Demko | B26B 1/04 30/153 |
| 7,856,910 | B2 * | 12/2010 | Kwok | B26B 3/00 30/314 |
| 8,016,694 | B2 * | 9/2011 | Llewellyn | A63B 53/04 473/335 |
| 8,065,942 | B2 * | 11/2011 | Loehnert | B26B 3/00 30/340 |
| 8,505,206 | B2 * | 8/2013 | VanHoy | B26B 1/044 30/153 |
| 8,635,782 | B2 * | 1/2014 | Russell, III | B26B 3/00 30/340 |
| 8,973,273 | B2 * | 3/2015 | Brown | B25D 3/00 30/155 |
| 9,156,234 | B1 * | 10/2015 | Hutton | B25G 1/00 |
| 9,700,764 | B2 * | 7/2017 | Carter | A63B 53/0466 |
| 9,731,178 | B1 * | 8/2017 | Myers | A63B 60/04 |
| 9,914,028 | B1 * | 3/2018 | Cleghorn | A63B 60/02 |
| 9,975,019 | B2 * | 5/2018 | Frame | A63B 53/0466 |
| 10,357,887 | B2 * | 7/2019 | Mundhra | B26B 1/10 |
| 10,363,672 | B2 * | 7/2019 | Kerulis | B26B 1/10 |
| 10,377,047 | B2 * | 8/2019 | Janovicz | F16B 1/00 |
| 10,617,921 | B2 * | 4/2020 | Busch | A63B 60/04 |
| 10,773,372 | B2 * | 9/2020 | Jovanovich | B25G 3/36 |
| 10,792,828 | B2 * | 10/2020 | Woolery | B26B 29/025 |
| 10,857,432 | B2 * | 12/2020 | Mardinly, Sr. | A63B 60/54 |
| D933,444 | S * | 10/2021 | Dickman | D8/99 |
| D936,171 | S * | 11/2021 | Dickman | D22/118 |
| D936,172 | S * | 11/2021 | Dickman | D22/118 |
| 11,167,435 | B2 * | 11/2021 | Elling | B26B 1/10 |
| D940,814 | S * | 1/2022 | Dobbs | D22/118 |
| D945,238 | S * | 3/2022 | Dickman | D8/99 |
| D945,239 | S * | 3/2022 | Dickman | D8/99 |
| D945,240 | S * | 3/2022 | Dickman | D8/99 |
| D945,241 | S * | 3/2022 | Dickman | D8/99 |
| D945,242 | S * | 3/2022 | Dickman | D8/20 |
| D945,243 | S * | 3/2022 | Dickman | D8/99 |
| D945,244 | S * | 3/2022 | Dickman | D8/99 |
| D951,747 | S * | 5/2022 | Dickman | D8/99 |
| 11,407,126 | B1 * | 8/2022 | Sharp | B26B 1/02 |
| 11,433,523 | B2 * | 9/2022 | Li | B25F 1/04 |
| 11,465,300 | B2 * | 10/2022 | Demko | B26B 1/10 |
| 11,472,045 | B2 * | 10/2022 | Sung | B26B 1/10 |
| 11,697,214 | B2 * | 7/2023 | Hunt | B26B 1/046 30/153 |
| 11,787,072 | B2 * | 10/2023 | Gallegos | B26B 5/003 30/162 |
| D1,018,248 | S * | 3/2024 | Delplanche | D8/99 |
| D1,020,427 | S * | 4/2024 | Delplanche | D8/99 |
| D1,032,320 | S * | 6/2024 | Delplanche | D8/99 |
| 12,251,849 | B1 * | 3/2025 | Marfione | B26B 3/00 |
| 2006/0178228 | A1 * | 8/2006 | DiMarco | A63B 60/02 473/345 |
| 2006/0207109 | A1 * | 9/2006 | Numata | B26B 3/00 30/342 |
| 2008/0235955 | A1 * | 10/2008 | Rosso | B25G 1/00 30/166.3 |
| 2009/0158600 | A1 * | 6/2009 | Ishai | B25G 1/00 30/314 |
| 2010/0139101 | A1 * | 6/2010 | Cooper | B25G 1/08 30/153 |
| 2010/0242287 | A1 * | 9/2010 | Jameson | B26B 1/10 30/155 |
| 2012/0017442 | A1 * | 1/2012 | King | B26B 1/10 30/155 |
| 2012/0151777 | A1 | 6/2012 | Ritter | |
| 2016/0167239 | A1 * | 6/2016 | Gallegos | B26B 1/08 30/162 |
| 2016/0339591 | A1 * | 11/2016 | Sung | B26B 1/02 |
| 2016/0368155 | A1 * | 12/2016 | Mandeville | B26B 1/04 |
| 2017/0066144 | A1 * | 3/2017 | Michael | B26B 1/02 |
| 2017/0129116 | A1 | 5/2017 | Gratsias et al. | |
| 2020/0189128 | A1 | 6/2020 | Elling et al. | |

(56) References Cited

U.S. PATENT DOCUMENTS

| | | | | |
|---|---|---|---|---|
| 2021/0252350 | A1* | 8/2021 | Patton | A63B 53/0416 |
| 2024/0066727 | A1* | 2/2024 | Helzer | B26B 3/00 |
| 2025/0100124 | A1* | 3/2025 | Huang | B26B 1/10 |

FOREIGN PATENT DOCUMENTS

| | | | | | |
|---|---|---|---|---|---|
| CN | 212044829 | U | * | 12/2020 | B26B 1/02 |
| CN | 214772178 | U | * | 11/2021 | B26B 1/10 |
| CN | 217046502 | U | * | 7/2022 | B26B 1/10 |
| CN | 220680856 | U | * | 3/2024 | B26B 1/10 |
| CN | 222644658 | U | * | 3/2025 | B26B 1/02 |
| DE | 3315768 | A1 | * | 10/1984 | B23B 3/00 |
| GB | 2332167 | A | * | 6/1999 | B26B 1/10 |
| JP | 50-155000 | U | | 12/1975 | |
| JP | 52-171800 | U | | 12/1977 | |
| JP | 63-088272 | U | | 6/1988 | |
| JP | 2025520795 | A | * | 7/2025 | B26B 3/00 |
| TW | 202023776 | A | | 7/2020 | |
| TW | I717147 | B | * | 1/2021 | B26B 1/10 |
| TW | I873704 | B | * | 2/2025 | B26B 3/00 |
| WO | WO2008013166 | A1 | | 1/2008 | |
| WO | WO-2024010830 | A1 | * | 1/2024 | B26B 3/00 |

* cited by examiner

ADJUSTABLE WEIGHTING SYSTEM IN KNIFE HANDLES

TECHNICAL FIELD

The present disclosure relates to the field of knives, and specifically to a knife with adjustable weights.

BACKGROUND

Knives are available in a variety of designs as required for various purposes. Generally, knives can be configured with either a fixed blade or a folding blade. Fixed blade knives are more suitable for heavy duty cutting tasks while folding knives are more compact. However, the specifications of a knife, such as its weight and the type of materials used, are typically chosen by the manufacturer so that customization by the end user is difficult or impractical.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION

Figure 1:
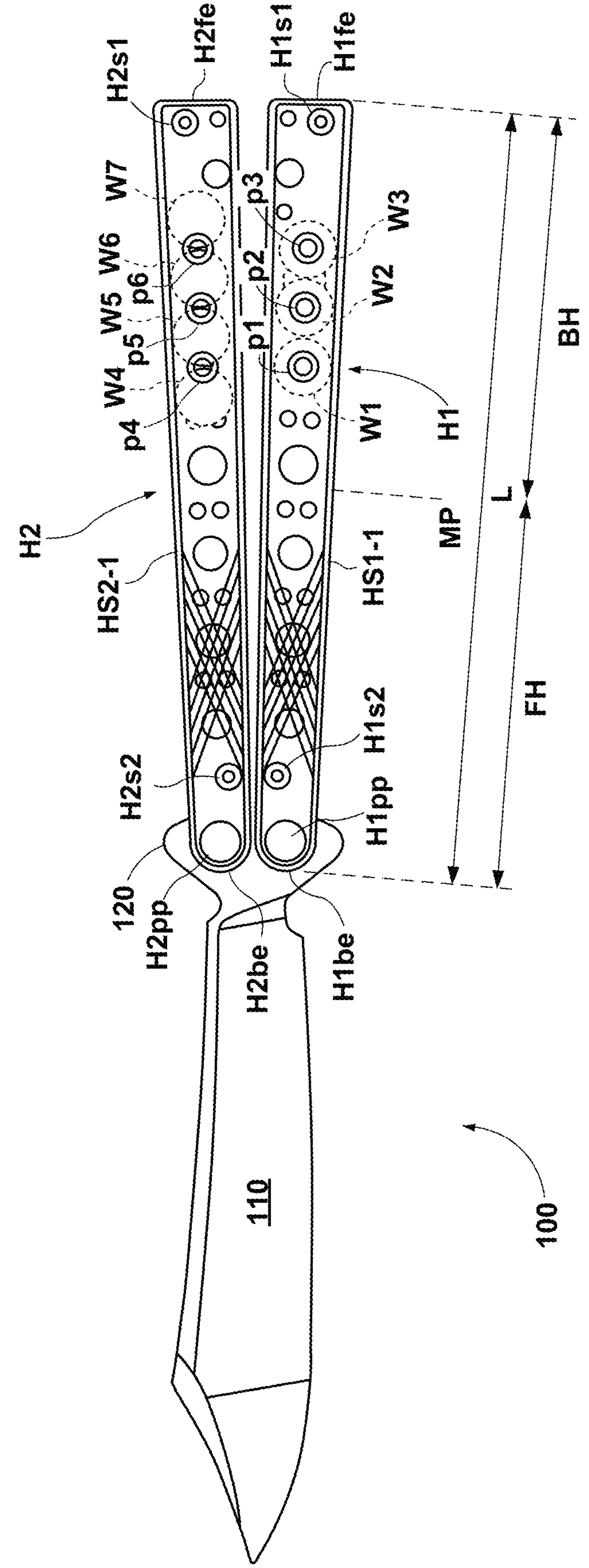
FIG. 1 is a side view of an example butterfly knife with an adjustable weighting system in the handles, in accordance with various embodiments.

In the following detailed description, reference is made to the accompanying figures which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As mentioned at the outset, options for customization of knives by the end user are limited. For example, in some cases, it may be desirable to allow the end user/customer to modify the overall weight and the weight distribution of a knife. Such a modification can be helpful, e.g., for tasks which require repeated fast movement of the knife, such as chopping food. Another example scenario involves knives which are manipulated for art or entertainment. For example, a growing number of knife hobbyists are interested in manipulating or flipping butterfly knives. A butterfly knife, also known as a Balisong (BALI-SONG®, Benchmade Knife Company, Inc., Oregon City, Oregon), fan knife or Batangas knife, is a type of folding pocketknife that originated in the Philippines. It has two handles which can counter-rotate around the tang. When the knife is closed, the blade is concealed within grooves in the handles. The knife can be deployed and spun around with a one-handed flipping motion. Other knives which can be opened with one hand using a flipping motion are also known, including so-called flipper knives. Moreover, in addition to the folding knives, fixed blade knives can also be manipulated.

In the above and other scenarios, the dynamics of the knife are significantly affected by its weight distribution and balance. For example, for a butterfly knife, more weight at the free end of the handles can increase the flipping speed. The ability to customize a knife my modifying its weight distribution is therefore desirable in many scenarios.

One possible solution is to add weight at the back of the knife by replacing the handle or back spacer. This indirectly modifies the balance since weight may be added in areas where it has little effect on the performance of the knife. Moreover, replacing the back spacer with a heavier material can be an expensive and complicated option, and requires the back spacer to be quite large to achieve the desired effect. For example, replacing the back spacer with a dense metal alloy such as a Tungsten alloy can be costly to manufacture due to the relatively complicated shape of the back spacer. The above solutions also do not allow easy customization and experimentation by the end user with different weights in different positions in the handle.

The techniques described herein address the above and other issues. In one aspect, a knife includes a blade and a handle attached to the blade. The handle includes a liner and a handle scale adapted to be secured to the liner, such as by screws. The handle scale has an inner side facing the liner and having a shaped region to secure a weight in a selected position along a length of the handle scale. In one approach, there are multiple discrete positions or pockets in which one or more weights can be secured. The weights can be metal discs, for example, or other metal objects. By using a disc, rectangle or other uncomplicated shape, the cost of the weight is minimized.

In one possible approach, the shaped region of the handle scale has a scalloped edge which provides multiple locations for placing the metal discs. A similar shaped region can be provided in the handle scale of the opposing side of the handle. In the case of a two-handed knife such as a butterfly knife, both handles can have a similar structure for storing weights.

The knife allows the end user to easily customize the weight distribution of a knife without interfering with the envelope or exterior surfaces of the handles. The user can add or remove weights as desired to achieve a desired weight distribution.

The above and other advantages will be further apparent in view of the following discussion.

FIG. 1 is a side view of an example butterfly knife 100 with an adjustable weighting system in the handles, in accordance with various embodiments. The techniques can be applied as well to a single-handled knife.

The knife includes a blade 110 having a tang 120. The tang has two holes through which pivot pins H1*pp* and H2*pp* are used to rotatably secure first and second handles H1 and H2, respectively. The first handle H1 extends from a blade end H1*be* to a free end H1*fe*, while the second handle H2 extends from a blade end H2*be* to a free end H2*fe*. Each handle has a length L and a midpoint MP which divides the handle into a front half FH and a back half BH.

Each handle may further include a handle scale, also referred to as a handle shell or cover, on opposing sides of the handle. This is the material which covers the outside surface of the handles, where the knife is gripped. For example, the first handle has handle scales HS1-1 (shown in FIG. 1) and HS1-2 (shown in FIG. 2-4). The second handle has handle scales HS2-1 (shown in FIG. 1) and HS2-2 (shown in FIG. 2-4). The handle scales can be fastened to a respective liner by screws, in one possible approach. For example, screws H1*s*1 and H1*s*2 can be used for the handle scale HS1-1 and screws H2*s*1 and H2*s*2 can be used for the handle scale HS2-1.

One or more removable weights can be secured within the handles and handle scales. For example, the handle scale HS1-1 secures weights W1-W3 and the handle scale HS2-1 secures weights W4-W7. The weights are round, e.g., metal discs, in this example. However, other shapes may be used, such as rectangular. In this example, a different number of weights is used in the two handles, e.g., three in H1 and four in H2.

The handle scale HS1-1 further includes viewing ports or apertures which allow viewing of whether a weight is present in a location corresponding to the viewing port. That is, the user can easily look through the ports to see where the weights are located. This is helpful as the user may not recall where the weights are placed, especially after experimenting with different configurations and numbers of weights. For example, viewing ports p1-p3 allow viewing of portions of the weights W1-W3, respectively. Similarly, the handle scale HS2-1 includes viewing ports p4-p6 which allows viewing of portions of the weights W4-W7. The handle scales may be made of a rigid materials such as a fiberglass composite, for example. Other materials could be used as well. The handle scales may be translucent, transparent or fully opaque. A translucent or transparent handle shell allows the user to see the weights and their positions, even if viewing ports are not used.

The weights can be stored in the back half of the handles but not the front half, in one approach as shown. This is desirable as the effect of the added weights is most pronounced when they are in the back half, due to the rotation of the back half about the pivot pins. Also, there is typically more room for the weights in the back half of the handle due to its increasing width toward the free end. However, it is an option for weights to be stored in the front half.

Figure 2:
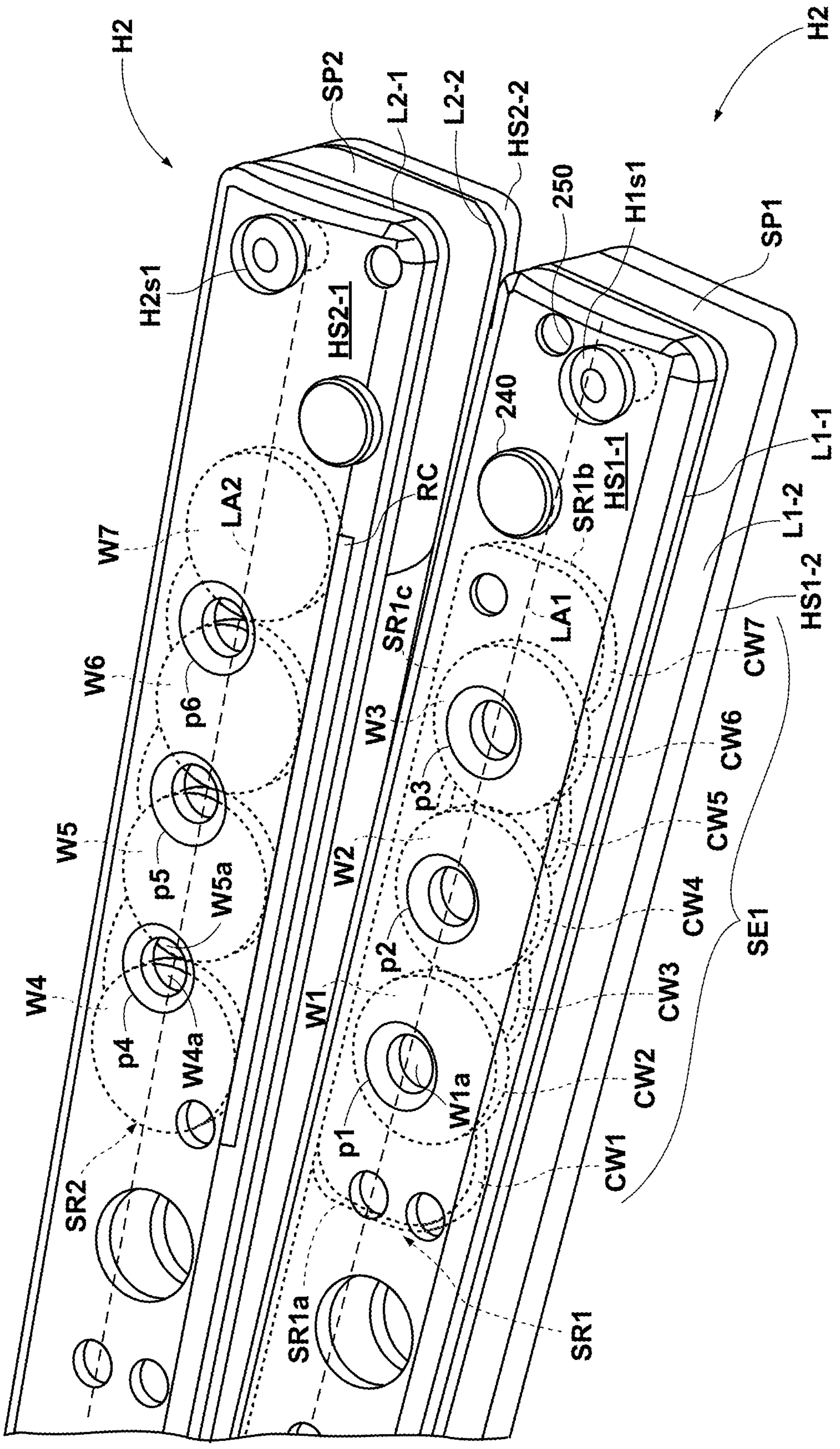
FIG. 2 is a dose up view of a portion of the handles of the knife of FIG. 1, including the handle scales, in accordance with various embodiments.

FIG. 2 is a close up view of a portion of the handles of the knife of FIG. 1, including the handle scales, in accordance with various embodiments. The handle scales are attached to respective liners by the screws. For example, in the first handle H1, the handle scale HS1-1 is attached to a liner L1-1 and the handle scale HS1-2 is attached to a liner L1-2. In the second handle H2, the handle scale HS2-1 is attached to a liner L2-1 and the handle scale HS2-2 is attached to a liner L2-2. The liners can be formed from sheet metal, for example. The two liners of a handle can be secured to one another by pin and screw combinations such as the example pin and screw combination 240 in the first handle, and separated by a spacer such as the example spacer SP1. The pin and screw combination allows the knife to be disassembled such as to replace the back spacer. Alternatively, rivets could be used which do not allow for disassembly. The spacer can be formed from plastic or other suitable material.

The handle scale HS1-1 has a shaped region SR1 in which the weights can be held. The shaped region can be on an inner face of the handle scale which faces the liner, so as to not interfere with the shape of the outer face of the handle scale which is held by the user. The shaped region can be considered to be a recessed region. The shaped region SR1 include a scalloped edge SE1 with curved walls CW1-CW7. The seven curved walls allow one or more weights to be placed in various positions along the longitudinal axis LA1 of the handle H1. In this example, three weights W1-W3 are placed. The weights are thin metal discs to minimize the width of the handle, but other shapes can be used. The weights should be dense to provide the most weight within a given volume. One example is Tungsten or a Tungsten alloy. In one approach, the weights are specially made for the handle and included with the knife or sold as an extra cost option. The user could potentially use other metal objects which are found around the home for weights, such as coins, washers and batteries or a malleable material such as clay. One example is Play-Doh® (Hasbro Inc.).

The shaped region SR1 further includes a wall SR1*c* opposite the scalloped edge, and walls SR1*a* and SR1*b* opposite one another along the longitudinal axis LA1.

A portion W1*a* of the weight W1 is visible in the viewing port p1 while other weights are visible in other viewing ports. The viewing port p1 shows that W1 is centered at the location of the viewing port p1. In contrast, in the handle scale HS2-1, the viewing port p4, for example, shows that portions W4*a* and W5*a* of the weights W4 and W5, respectively, are visible. In particular, the edges of these two weights are visible. Similarly, the viewing port p5 reveals portions of the weights W4 and W5, and the viewing port p6 reveals portions of the weights W6 and W7. A further feature depicted in the handle scale HS2-1 is a rubber cord RC (see also FIG. 3) which holds the weights in place to avoid rattling.

The screws can be recessed from the outer side of the handle shells. For example, the screw H1*s*1 is in a recess 250 so that it does not protrude from the handle shell. This screw head therefore does not interfere with the user's grip on the handle. The screw is a socket button head in this example with a rounded profile and a hex socket drive. The user can easily remove the handle shell from the liner, or secure the handle shell to the liner, by turning the screws with a hex key such as an Allen wrench. Other configurations are possible. For example, a socket flat head screw could be used, where the head is flush with, or recessed from, the outside side of the handle shell.

Figure 3:
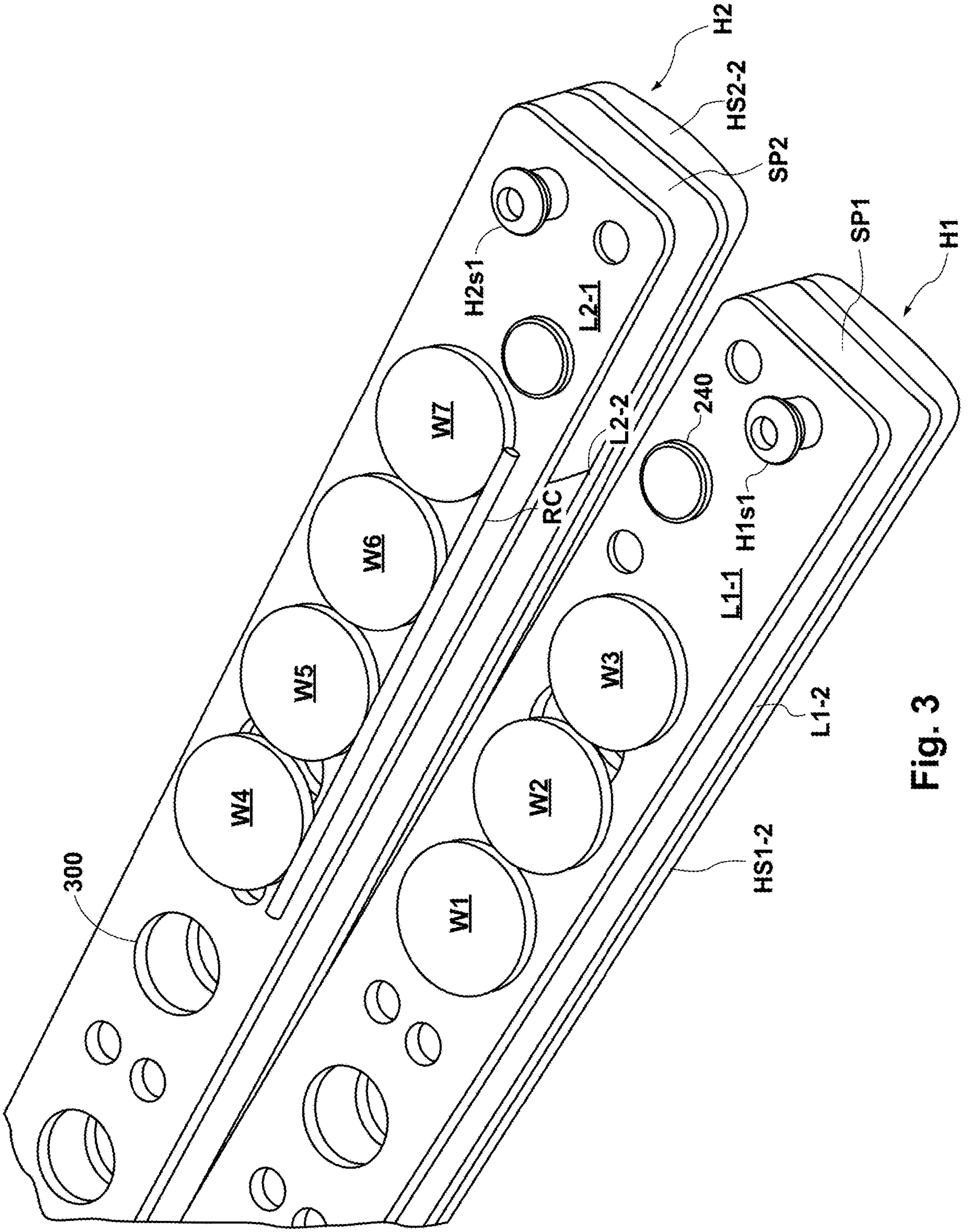
FIG. 3 is a view of the handles of FIG. 2 without the handle scales HS1a and HS2a, in accordance with various embodiments.

FIG. 3 is a view of the handles of FIG. 2 without the handle scales HS1*a* and HS2*a*, in accordance with various embodiments. This figures depicts the liners L1-1 and L1-2 of the first handle H1, and the liners L2-1 and L2-2 of the second handle H2. The handle scales HS1-2 and HS2-2 are also depicted. The liners can include cutouts, such as example cutout 300, which are circular in this example, to reduce weight.

The rubber cord RC is also depicted for the second handle. The cord can also be provided for the first handle but is not depicted here. A rubber cord may be selected to due it low cost and ready availability. Other resilient materials could be used such as silicone, nitrile, vinyl and neoprene. The rubber cord prevents rattling when the weights are placed in the shaped region of the handle scale. The weights may abut the rubber cord. See also FIG. 12.

Figure 4:
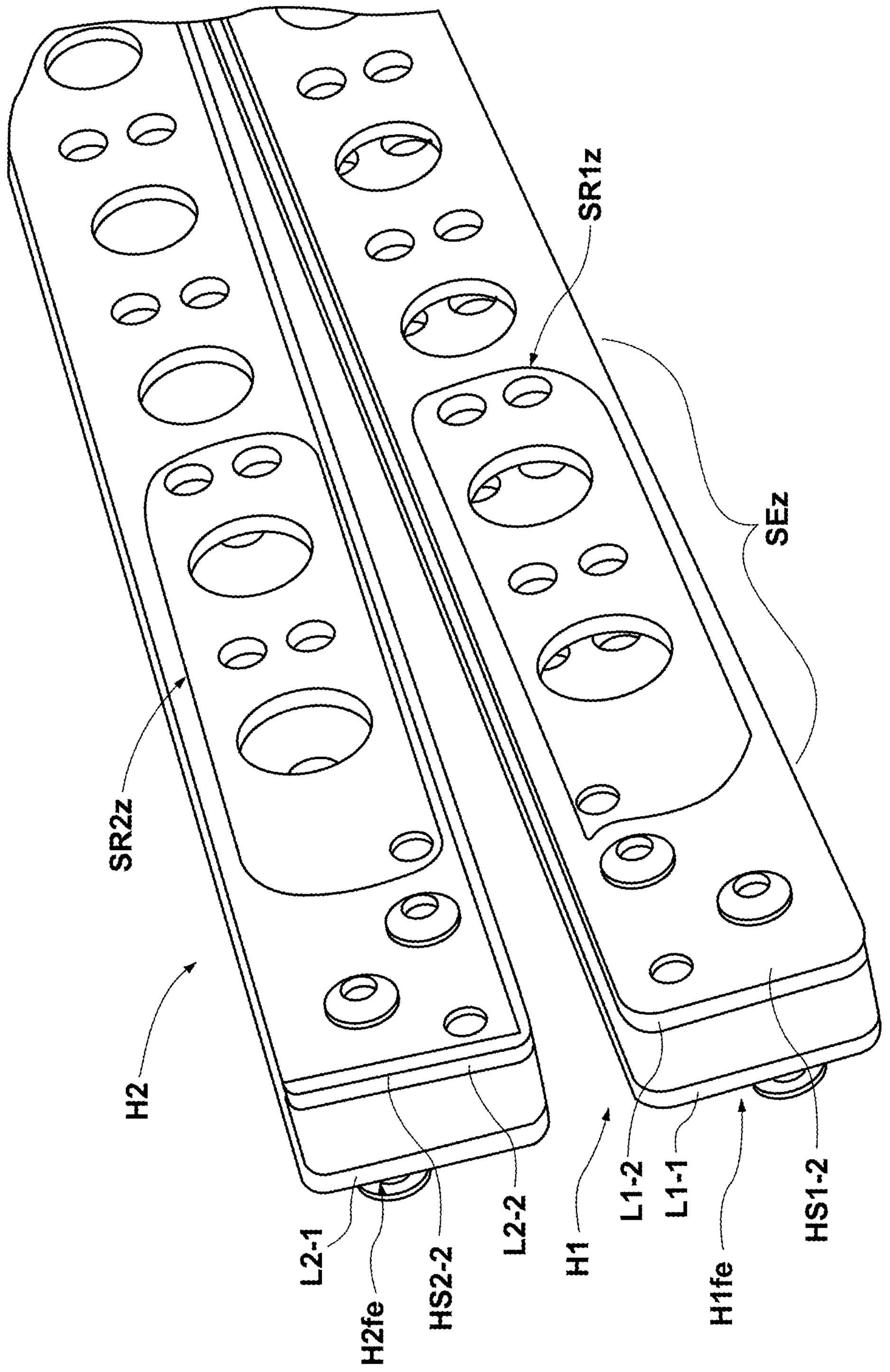
FIG. 4 is a view of the handles of FIG. 2, looking forward from their free ends H1fe and H2fe, in accordance with various embodiments.

FIG. 4 is a view of the handles of FIG. 2, looking forward from their free ends H1*fe* and H2*fe*, in accordance with various embodiments. A shaped region SR1*z* of the handle scale HS1-2 is depicted with a scalloped edge SEz, similar to the shaped region SR1 of the handle scale HS1-1, on the opposite side of the handle H1. A corresponding shaped region SR2*z* of the handle scale HS2-2 is also depicted. Note that while the two opposing handle scales of each handle can secure weights in this example, other options are possible. For example, just one handle scale of the two opposing handle scales of each handle may have a shaped region to secure weights.

Figure 5:
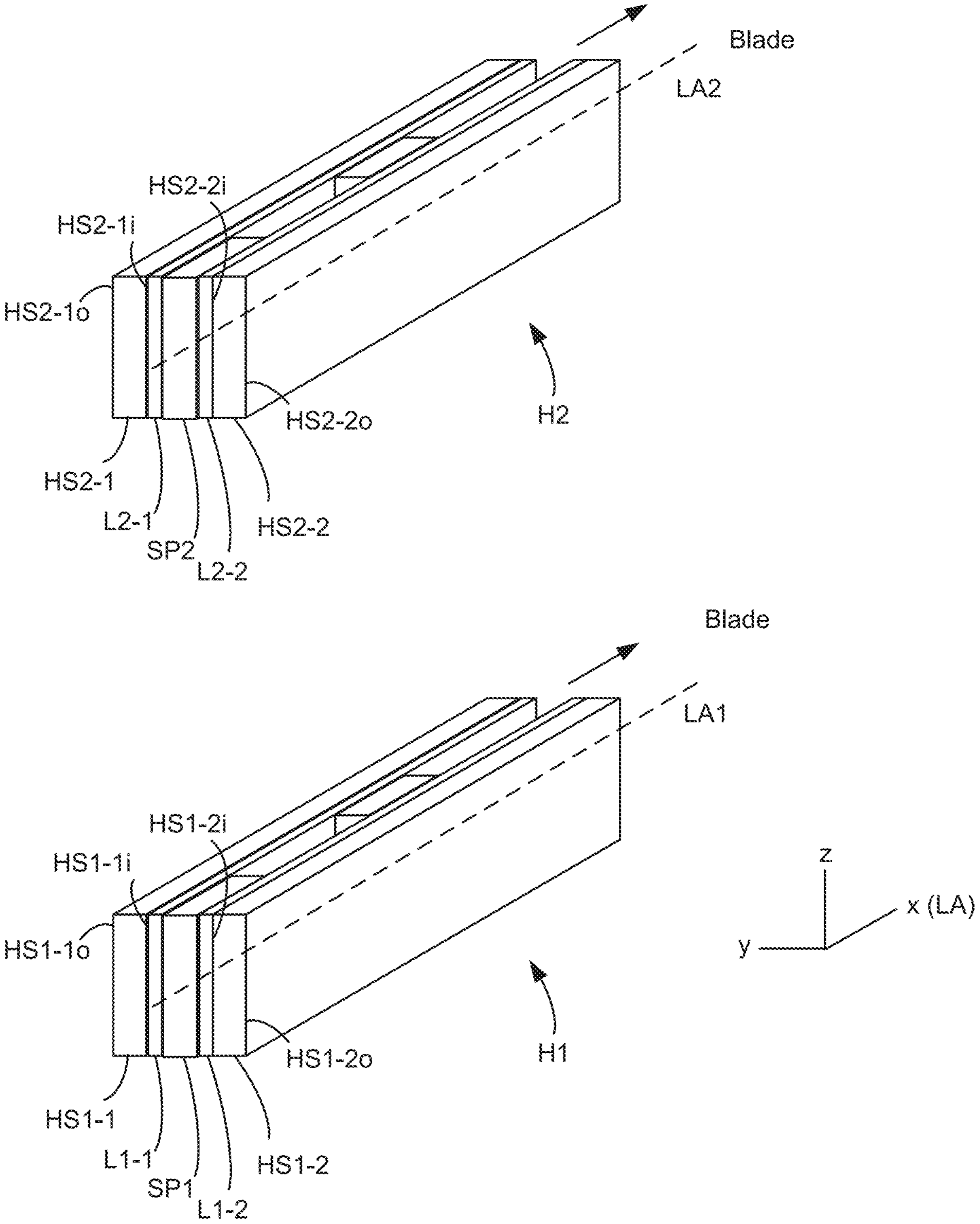
FIG. 5 is a simplified isometric view of the handles of FIG. 1, in accordance with various embodiments.

FIG. 5 is a simplified isometric view of the handles of FIG. 1, in accordance with various embodiments. The handles are shown as rectangles for simplicity. The first handle H1 includes a first handle scale HS1-1, a first liner L1-1, a spacer SP1, a second liner L1-2 and a second handle scale HS1-2. The first handle scale HS1-1 has an outer side HS1-1*o* (or face) and an inner side HS1-1*i* (or face). The second handle scale HS1-2 has an outer side HS1-2*o* and an inner side HS1-2*i*. The first handle extends in length along a first longitudinal axis LA1.

The second handle H2 includes a first handle scale HS2-1, a first liner L2-1, a spacer SP2, a second liner L2-2 and a second handle scale HS2-2. The first handle scale HS2-1 has an outer side HS2-1*o* and an inner side HS2-1*i*. The second handle scale HS2-2 has an outer side HS2-2*o* and an inner side HS2-2*i*. The second handle extends in length along a second longitudinal axis LA2.

A Cartesian coordinate system depicts x, y and z axis, where the x axis is parallel to the longitudinal axis, and the y and z axes are perpendicular to the x axis as shown.

Figure 6:
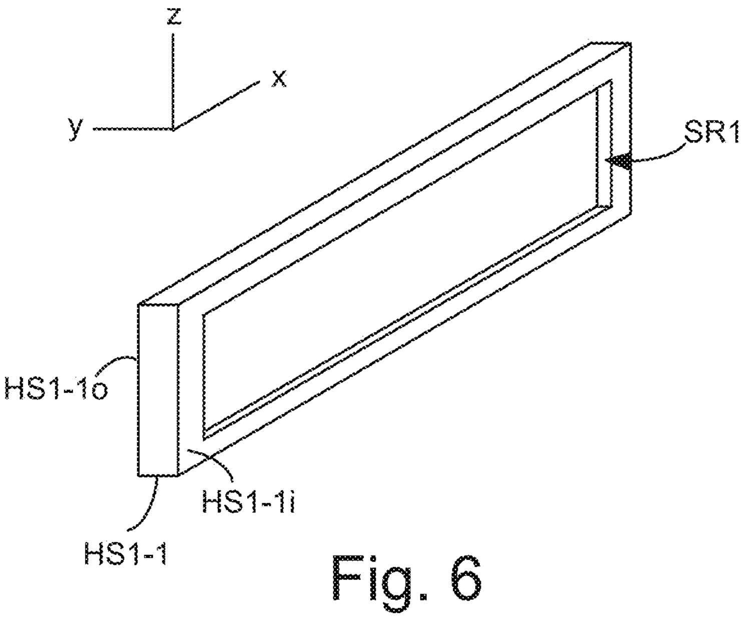
FIG. 6 is an isometric view of the handle scale HS1-1 of FIG. 5, in accordance with various embodiments.

FIG. 6 is an isometric view of the handle scale HS1-1 of FIG. 5, in accordance with various embodiments. The handle scale includes the inner side HS1-1*i* and the outer side HS1-1*o*. The shaped region SR1 is on the inner side. The shaped region is depicted as a rectangle in this example for generality as other shapes could be used. The shaped region can be a recessed region which includes structures for securing one or more weights, such as discussed further in connection with FIG. 7-17.

Figure 7:
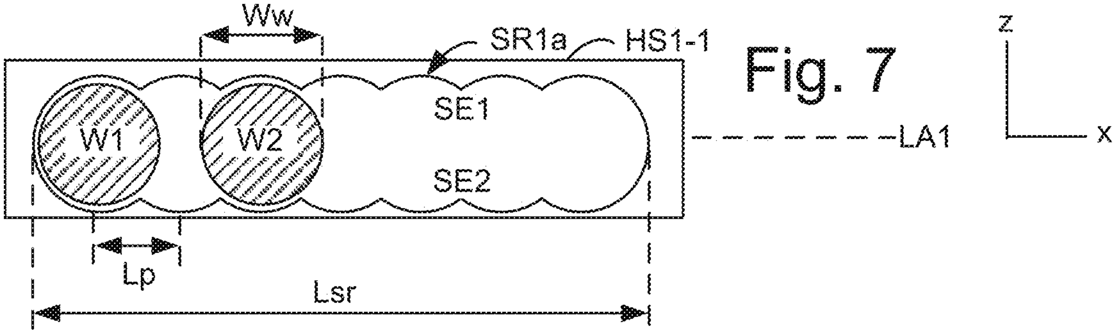
FIG. 7 is an example side view of the handle scale HS1-1 of FIG. 6, where the shaped region SR1a comprises opposing scalloped edges SE1 and SE2 with a relatively large spacing Lp, in accordance with various embodiments.

FIG. 7 is an example side view of the handle scale HS1-1 of FIG. 6, where the shaped region SR1*a* comprises opposing scalloped edges SE1 and SE2 with a relatively large spacing Lp, in accordance with various embodiments. Each weight is a disc with a width or diameter Ww. The scalloped edges provide seven discrete positions along the longitudinal axis LA1 in which weights can be secured. In this example, two weights are used, although up to four weights can be accommodated. A spacing or distance between the discrete positions is Lp. Each discrete position may correspond to the midpoint of a curved wall in the scalloped edge, for example. The length of the shaped region SR1*a* is Lsr.

Figure 8:
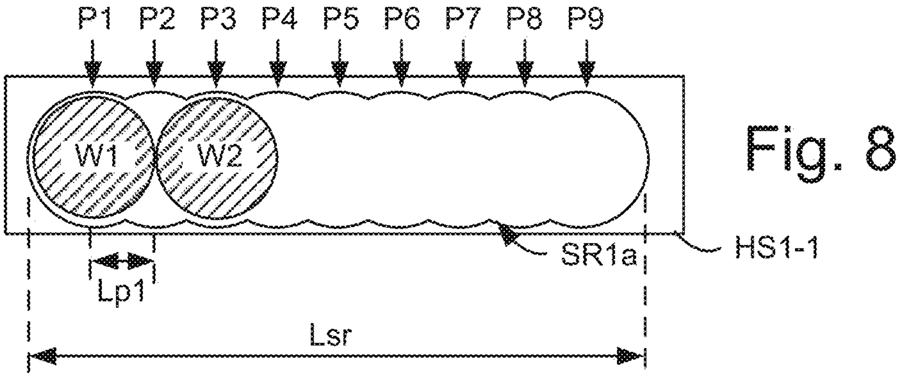
FIG. 8 is an example side view of the handle scale HS1-1 of FIG. 6, where the shaped region SR1a comprises opposing scalloped edges with a relatively small spacing Lp1<Lp, in accordance with various embodiments.

FIG. 8 is an example side view of the handle scale HS1-1 of FIG. 6, where the shaped region SR1*a* comprises opposing scalloped edges with a relatively small spacing Lp1<Lp, in accordance with various embodiments. The scalloped edges provide nine discrete positions along the longitudinal axis LA1 in which weights can be secured. In this example, two weights are used. A spacing or distance between the discrete positions is Lp1. With this spacing, the weights are as close together as possible and may abut one another. This maximizes the number of weights which can be used in the same length of the shaped region SR1*a*. For example, five weights can be used instead of the four in the example of FIG. 7.

This is an example where at least one discrete position (P1) of a plurality of discrete positions (P1-P9) is separated from an adjacent discrete position (P2) of the plurality of discrete positions by a distance Lp1 which is less than a width Ww of the weight along the length of the first handle scale.

Figure 9:
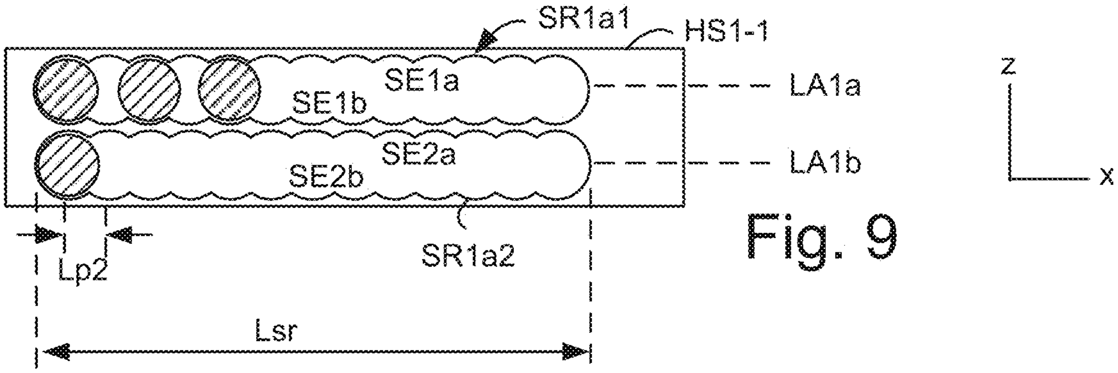
FIG. 9 is an example side view of the handle scale HS1-1 of FIG. 6, where two shaped regions SR1a1 and SR1a2 with opposing scalloped edges are provided, in accordance with various embodiments.

FIG. 9 is an example side view of the handle scale HS1-1 of FIG. 6, where two shaped regions SR1*a*1 and SR1*a*2 with opposing scalloped edges are provided, in accordance with various embodiments. The shaped region SR1*a*1 has opposing scalloped edges SE1*a* and SE1*b* and the shaped region SR1*a*2 has opposing scalloped edges SE2*a* and SE2*b*. This approach allows the weight distribution to be adjusted in the z direction as well as the x direction of the handle, as more weight can be placed in SR1*a*1 than in SR1*a*2, for example. In this example, SR1*a*1 has three weights and SR1*a*2 has one weight. Additionally, the scalloped edges provide thirteen discrete positions to place the weights and the distance between adjacent discrete positions is Lp2. The two shaped regions extend parallel to one another.

Figure 10:
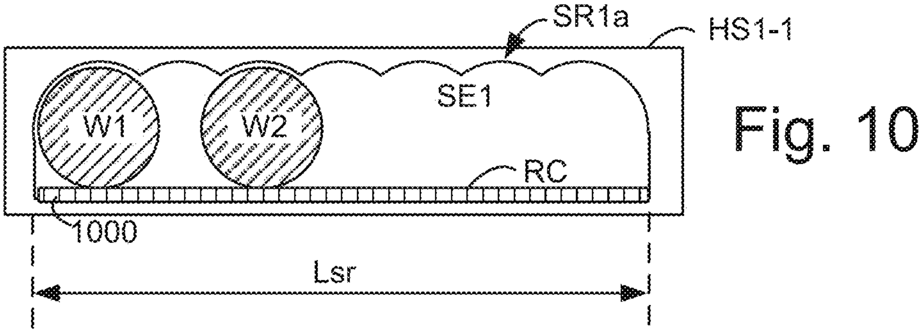
FIG. 10 is an example side view of the handle scale HS1-1 of FIG. 6, where a shaped region SR1a has a scalloped edge SE1 on one side and a straight edge 1000 with a rubber cord RC on the other side, in accordance with various embodiments.

FIG. 10 is an example side view of the handle scale HS1-1 of FIG. 6, where a shaped region SR1*a* has a scalloped edge SE1 on one side and a straight edge 1000 with a rubber cord RC on the other side, in accordance with various embodiments. This embodiment is consistent with FIG. 3, for example. The rubber cord can be attached to the edge 1000 with glue, for example, to avoid it being lost when the user removes the handle scale. Alternatively, the rubber cord can be free to be replaced or removed. For example, the user may desire to use a wider cord if a smaller diameter weight is used. The user may also desire to use multiple rubber cords in a shaped region. The cord can have a circular or other cross sectional shape.

Figure 11:
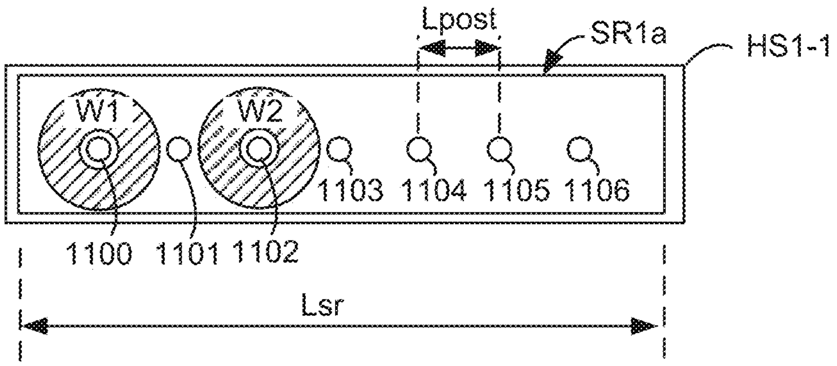
FIG. 11 is an example side view of the handle scale HS1-1 of FIG. 6, where a shaped region SR1a has posts 1100-1106 on which weights can be mounted, in accordance with various embodiments.

FIG. 11 is an example side view of the handle scale HS1-1 of FIG. 6, where a shaped region SR1*a* has posts 1100-1106 on which weights can be mounted, in accordance with various embodiments. The posts can be cylindrical, in one approach. The diameter of each post is slightly less than the diameter of a hole in the middle of each circular weight, in one approach. The weights W1 and W2 are mounted or secured to the posts 1100 and 1102, respectively. Lpost denotes a distance between posts, which is the distance between the discrete positions in which a weight can be secured. A rubber cord is not shown but may be used as well.

Figure 12:
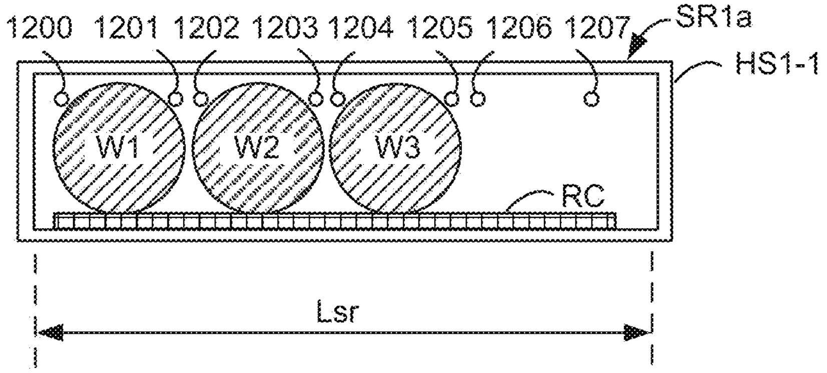
FIG. 12 is an example side view of the handle scale HS1-1 of FIG. 6, where a shaped region SR1a has posts for securing weights, in accordance with various embodiments.

FIG. 12 is an example side view of the handle scale HS1-1 of FIG. 6, where a shaped region SR1*a* has posts 1200-1207 for securing weights, in accordance with various embodiments. The posts contact the circumference of the disc-shaped weights, in this approach to prevent or limit movement along the longitudinal axis. This approach avoids the need for central holes in the weights, thereby avoiding the weight loss when the hole is made. A potential disadvantage is fewer discrete locations for securing the weights. In this example, a weight W1 is secured between the posts 1200 and 1201, a weight W2 is secured between the posts 1202 and 1203, and a weight W3 is secured between the posts 1204 and 1205. A rubber cord RC is also used in this example.

Figure 13:
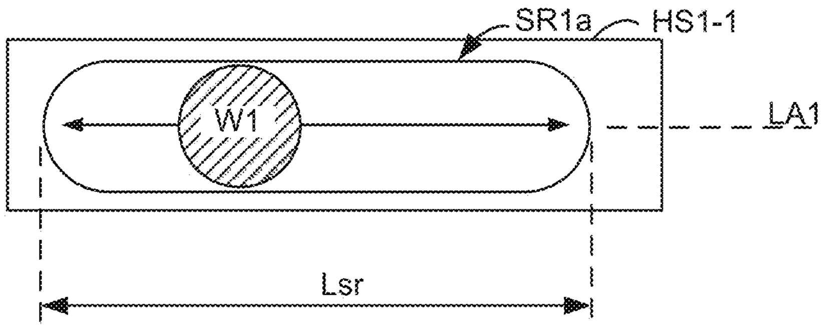
FIG. 13 is an example side view of the handle scale HS1-1 of FIG. 6, where a shaped region SR1a allows movement of a weight along the longitudinal axis (LA1), in accordance with various embodiments.

FIG. 13 is an example side view of the handle scale HS1-1 of FIG. 6, where a shaped region SR1*a* allows movement of a weight along the longitudinal axis (LA1), in accordance with various embodiments. The weight W1 can move along the length Lsr of the shaped region. The weight may slide or roll within the shaped region, for example. This approach can potentially change the dynamic qualities of the handles as well as providing an interesting sound.

Figure 14:
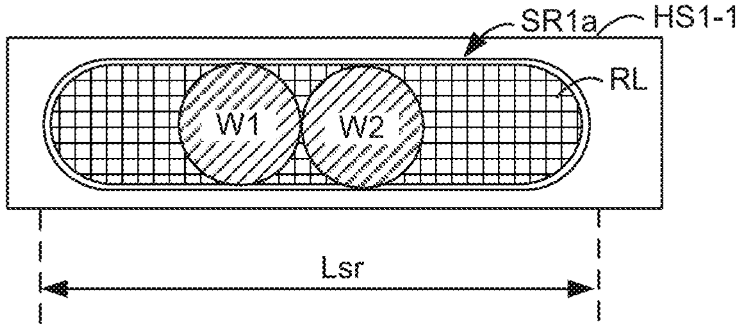
FIG. 14 is an example side view of the handle scale HS1-1 of FIG. 6, where a rubber layer (RL) secures weights, in accordance with various embodiments.

FIG. 14 is an example side view of the handle scale HS1-1 of FIG. 6, where a rubber layer (RL) secures weights, in accordance with various embodiments. When the handle scale is secured to the respective liner by the screws, the rubber layer presses on the weights W1 and W2 to keep them in place, and thus prevent movement along the longitudinal axis. This approach advantageously allows the weights to be place in any position within the shaped region. The positions of the weights are therefore infinitely adjustable. The weights are not limited to being placed in discrete positions which are dictated by structures in the shaped region. Optionally, the rubber layer is removable to provide the configuration of FIG. 13.

Figure 15:
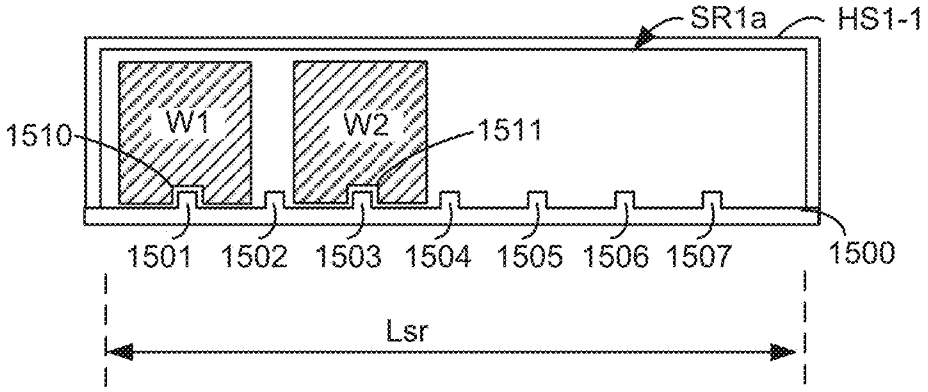
FIG. 15 is an example side view of the handle scale HS1-1 of FIG. 6, where the shaped region SR1a comprises tabs on one side for securing weights, in accordance with various embodiments.

FIG. 15 is an example side view of the handle scale HS1-1 of FIG. 6, where the shaped region SR1*a* comprises tabs on one side for securing weights, in accordance with various embodiments. Generally, the removable weights can have different shapes. In this example, the weights are rectangular and each has a notch to allow the weight to be secured to a respective tab 1501-1507 at an edge 1500 of the shaped region. For example, weights W1 and W2 have notches 1510 and 1511, respectively, which allow them to be secured to the tabs 1501 and 1503, respectively.

Figure 16:
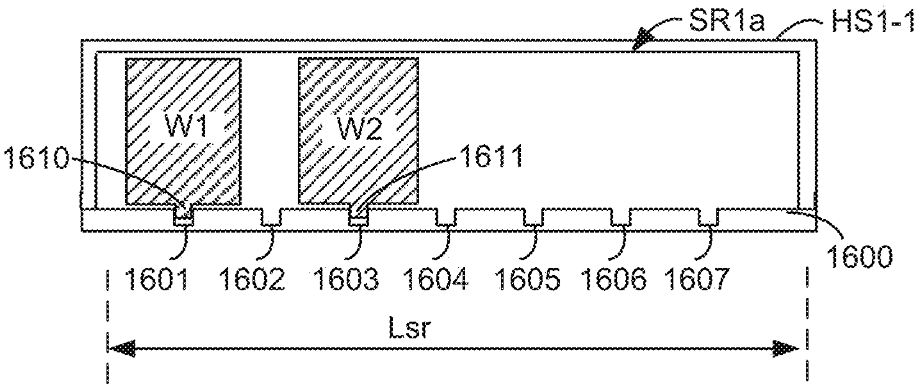
FIG. 16 is an example side view of the handle scale HS1-1 of FIG. 6, where the shaped region SR1a comprises notches on one side for securing weights, in accordance with various embodiments.

FIG. 16 is an example side view of the handle scale HS1-1 of FIG. 6, where the shaped region SR1*a* comprises notches on one side for securing weights, in accordance with various embodiments. In this example, the weights are rectangular and each has a tab to allow the weight to be secured in a respective notch 1601-1607 at an edge 1600 of the shaped region. For example, weights W1 and W2 have tabs 1610 and 1611, respectively, which allow them to be secured in the notches 1601 and 1603, respectively.

Figure 17:
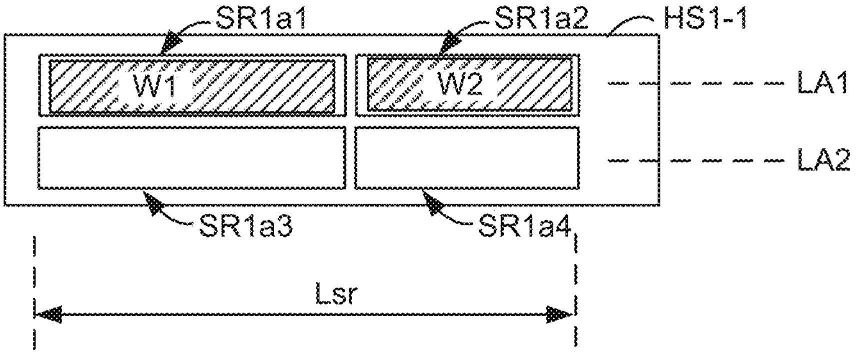
FIG. 17 is an example side view of the handle scale HS1-1 of FIG. 6, where four rectangular shaped regions SR1a1-SR1a4 can secure respective weights, in accordance with various embodiments.

FIG. 17 is an example side view of the handle scale HS1-1 of FIG. 6, where four rectangular shaped regions SR1*a*1-SR1*a*4 can secure respective weights, in accordance with various embodiments. In this example, a weight W1 is secured in the shaped region SR1*a*1 and a weight W2 is secured in the shaped region SR1*a*2. The shaped regions SR1*a*1 and SR1*a*2 extend along the longitudinal axis LA1 and the shaped regions SR1*a*3 and SR1*a*4 extend along the longitudinal axis LA2. Other variations in terms of the weights and shaped regions are possible as well.

In this example, the shaped regions are configured to secure different sized weights. For example, SR1*a*1 and SR1*a*2 are first and second regions, respectively, where the first region is sized to secure a larger and heavier weight (W1) than the weight (W2) which can be secured by the second region.

FIGS. 7-12 and 15-17 depict examples of a plurality of periodic retention structures in a handle or handle shell to retain the one or more respective removable weights. In FIG. 7-10, the retention structures are curved walls. In FIGS. 11 and 12, the retention structures are posts. In FIG. 15, the retention structures are tabs. In FIG. 16, the retention structures are notches. In FIG. 17, the retention structures are separate shaped or recessed regions.

FIG. 7-17 depict examples of structures in a portion of a knife handle for retaining one or more removable weights within a range of positions along a length of the handle, e.g., the range is defined by the length Lsr. In one approach, the range of positions extends between a midpoint MP of the handle and a free end H1*fe* or H2*fe* of the handle (see FIG. 1). That is, the range of positions may be limited to being in the back half of the handle where the dynamic qualities are most affected.

The spacing between the discrete positions which can secure the weights can be uniform or non-uniform.

While the shaped region is depicted as being in the inner side of the handle shell, other options are possible. For example, the liner can be shaped, or a shaped region can be attached to the liner, where the handle shell is then attached to cover this shaped region.

Figure 18:
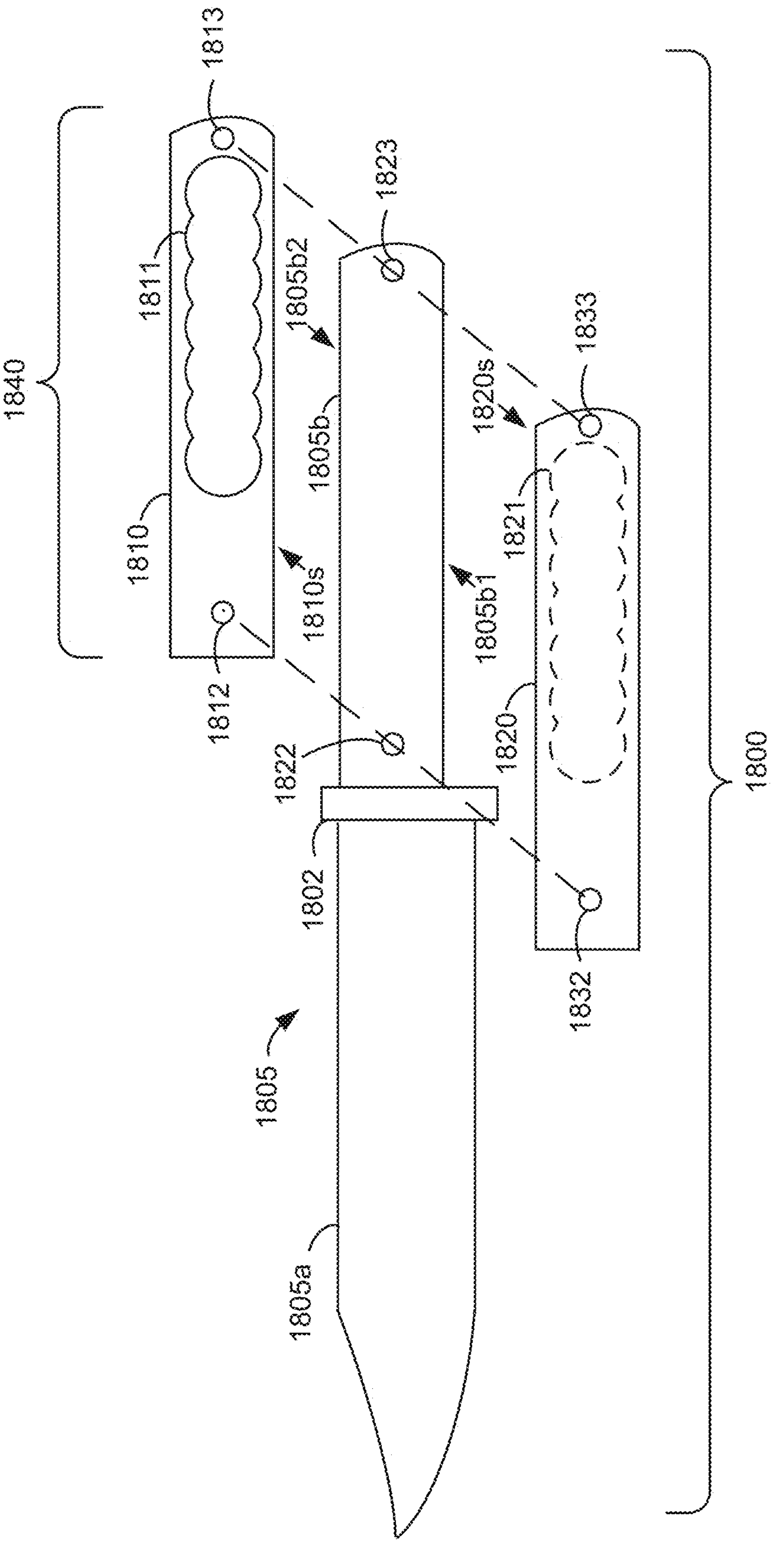
FIG. 18 depicts a single-handled fixed blade knife with handle scales having shaped regions for holding weights, in accordance with various embodiments.

FIG. 18 depicts a single-handled fixed blade knife with handle scales having shaped regions for holding weights, in accordance with various embodiments. In contrast to a folding knife, a single-handled fixed blade knife typically has a central tang to which the handle shells are attached on opposing sides, and liners are not used. In this example, the knife 1800 include a blade 1805 having a sharpened portion 1805*a* and a tang 1805*b*. The sharpened portion and the tang may be formed of one continuous piece of metal. The knife has a full tang in this example since the tang extends to the end of the knife. A guard 1802 surrounds the blade to separate the sharpened portion from the tang. A first handle shell 1820 is attached to a first side 1805*b*1 of the tang and a second handle shell 1810 is attached to a second, opposing side 1805*b*2 of the tang. The first handle shell has an inner side 1820*s* with a shaped region 1821 for holding one or more weights, and the second handle shell has an inner side 1810*s* with a shaped region 1811 for holding one or more weights. The shaped regions are scallop shaped in this example, similar to the examples of FIGS. 7 and 8. Any of the shaped regions or structures for holding weights in place as discussed previously may be used.

The handle shells and the tang may include holes through which a screw or other fastener is inserted to hold the shells to the tang. For example, the first handle shell 1820 includes holes 1832 and 1833, the tang includes holes 1822 and 1823 and the second handle shell includes holes 1812 and 1813. The fasteners can be easily removed and re-installed to allow the user to add, remove or adjust the positions of the weights.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A knife, comprising:

a blade; and a handle attached to the blade, wherein the handle comprises a first liner and a first handle scale, wherein the first handle scale comprises an inner side facing the first liner and is secured to the first liner, and wherein the inner side of the first handle scale comprises a recessed region defining a plurality of positions within the recessed region in which to secure a plurality of removable weights spaced along a length of the first handle scale, wherein placement of the plurality of removable weights within one or more of the plurality of positions is selectable by a user to control weight distribution of the knife.

2. The knife of claim 1, wherein:

at least one of the plurality of positions is separated from an adjacent position of the plurality of positions by a distance which is less than a width of the weight along the length of the first handle scale.

3. The knife of claim 1, wherein:

the recessed region comprises a plurality of retention structures spaced apart along the length of the first handle scale; and each retention structure of the plurality of retention structures corresponds to a respective position of the plurality of positions.

4. The knife of claim 3, wherein:

the retention structures comprise at least one of tabs, posts or notches.

5. The knife of claim 1, wherein:

the recessed region comprises a scalloped edge with a plurality of curved walls; and each curved wall of the plurality of curved walls corresponds to a respective position of the plurality of positions.

6. The knife of claim 5, wherein the scalloped edge is on one side of the recessed region, and the knife further comprises a rubber cord on an opposite side of the recessed region to secure the plurality of removable weights.

7. The knife of claim 1, wherein the plurality of weights which are to be secured in the recessed region are discs.

8. The knife of claim 1, wherein the first handle scale comprises an outer side facing away from the first liner and a viewing port extending from the outer side to the inner side, to allow viewing of whether a weight of the plurality of removable weights is secured in the first handle scale at a location corresponding to the viewing port.

9. The knife of claim 1, wherein the handle comprises a second liner, a spacer between the first liner and the second liner, and a second handle scale adapted to be secured to the second liner, the second handle scale comprises an inner side facing the second liner, and the inner side of the second handle scale comprises a second recessed region including a plurality of second positions within the second recessed region in which to secure a second plurality of removable weights spaced along a length of the second handle scale.

10. The knife of claim 1, wherein:

the recessed region comprises a first region and a second region; and the first region is sized to secure a heavier one of the plurality of weights than another one of the plurality of weights which can be secured by the second region.

11. The knife of claim 1, wherein the knife is a butterfly knife, the knife further comprising:

a second handle attached to the blade, wherein the second handle comprises a respective liner and a respective handle scale, the respective handle scale comprises an inner side facing the respective liner and is secured to the respective liner, and the inner side of the respective handle scale comprises a recessed region having a plurality of positions within the recessed region in which to secure a respective plurality of removable weights spaced along a length of the respective handle scale.

12. The knife of claim 1, wherein the knife is a single-handled knife.

* * * * *